No. 876,302. PATENTED JAN. 7, 1908.
E. T. DAVIES.
BAND SAWING MACHINE.
APPLICATION FILED JUNE 13, 1907.

2 SHEETS—SHEET 1.

WITNESSES
F. C. Barry
Perry B. Turpin

INVENTOR
Evan T. Davies
BY Munn & Co.
ATTORNEYS

No. 876,302.
PATENTED JAN. 7, 1908.
E. T. DAVIES.
BAND SAWING MACHINE.
APPLICATION FILED JUNE 13, 1907.
2 SHEETS—SHEET 2.
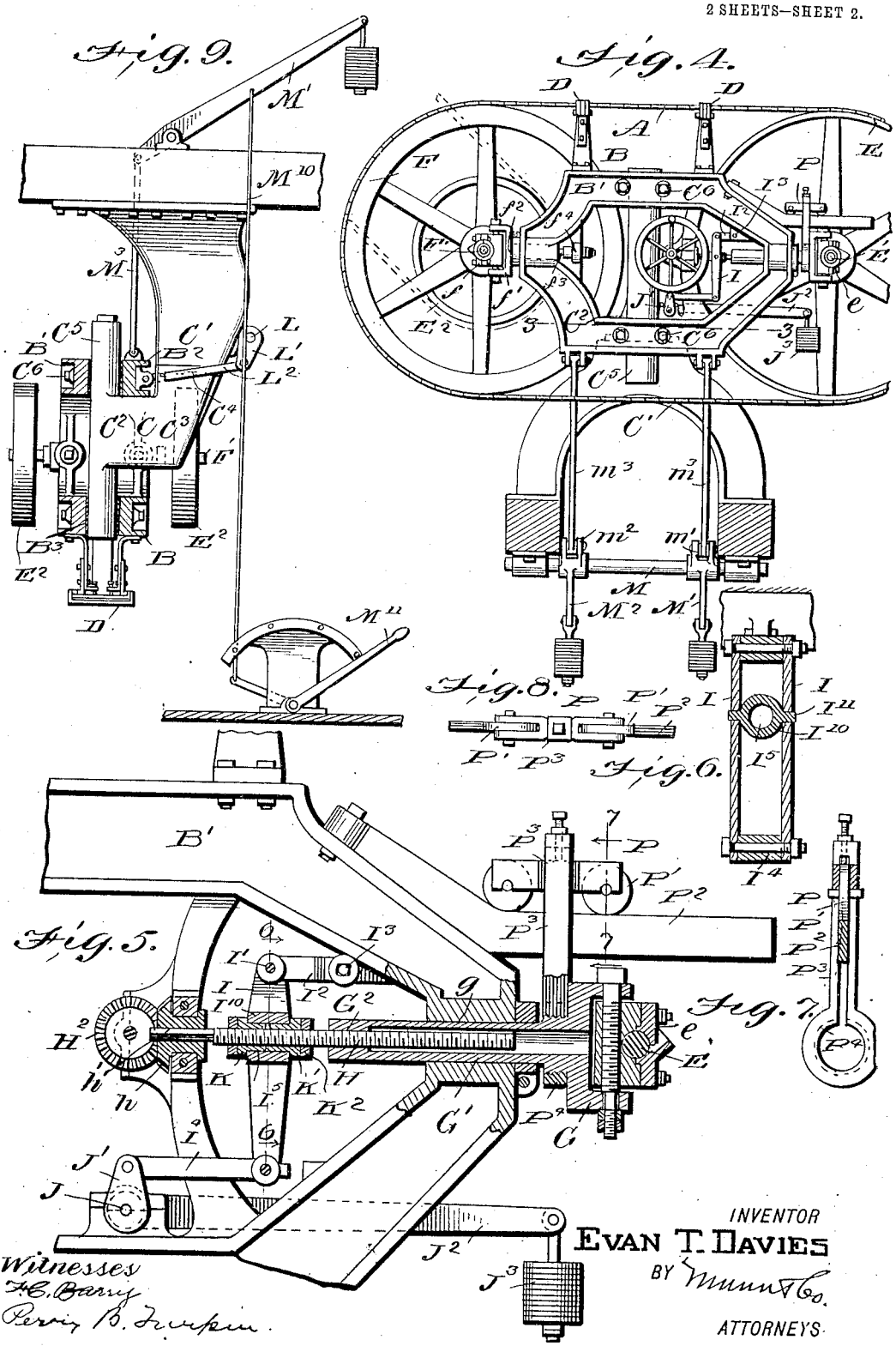
INVENTOR
Evan T. Davies
BY Munn & Co.
ATTORNEYS

UNITED STATES PATENT OFFICE.

EVAN T. DAVIES, OF PORTLAND, OREGON.

BAND SAWING-MACHINE.

No. 876,302.     Specification of Letters Patent.     Patented Jan. 7, 1908.

Original application filed November 16, 1906, Serial No. 343,701. Divided and this application filed June 13, 1907. Serial No. 378,812.

*To all whom it may concern:*

Be it known that I, EVAN T. DAVIES, a citizen of the United States, and a resident of Portland, in the county of Multnomah and State of Oregon, have invented certain new and useful Improvements in Band Sawing-Machines, of which the following is a specification.

My invention is an improvement in sawing apparatus, and consists in certain novel constructions and combinations of parts as will be hereinafter described and claimed; the present application being a division of a prior application No. 343,701 filed Nov. 16, 1906.

Figure 1:
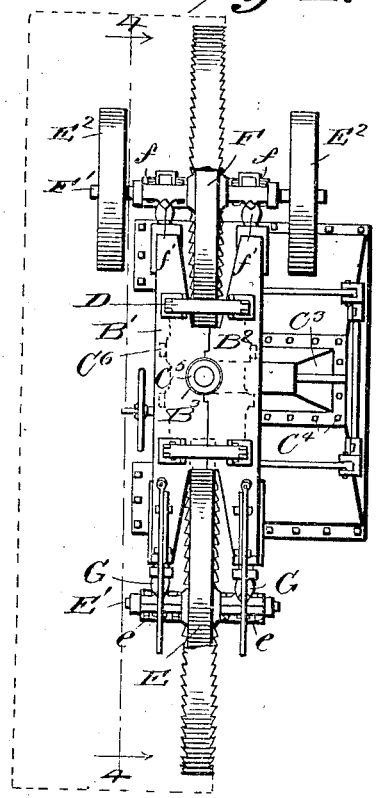
Figure 2:
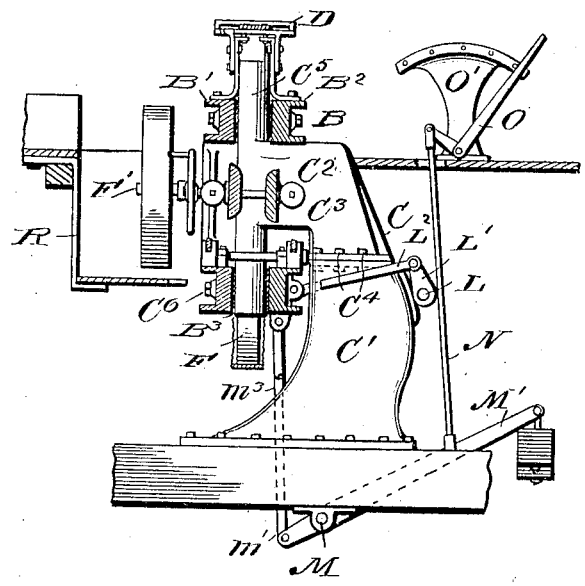
Figure 3:
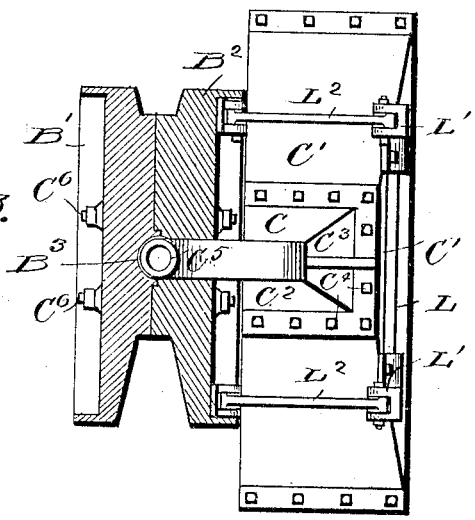

In the drawings Figure 1 is a top plan view of an apparatus embodying my invention, the saw band being partly broken away. Fig. 2 is a vertical longitudinal section of the apparatus, portions of the platforms on opposite sides being illustrated. Fig. 3 is a cross-section on about line 3—3 of Fig. 4. Fig. 4 is a vertical cross-section on about line 4—4 of Fig. 1. Fig. 5 is a detail face view partly broken in section of a portion of the saw frame illustrating the straining devices. Fig. 6 is a detail vertical section on about line 6—6 of Fig. 5. Fig. 7 is a detail vertical section on about line 7—7 of Fig. 5. Fig. 8 is a detail top plan view of the carriage for the straining devices, and Fig. 9 illustrates the saw frame carried by a hanger instead of mounted on a stand, as shown in Fig. 2.

In carrying out my invention, I provide a band saw A, toothed at both edges, as shown in the drawings, see Fig. 1, a saw frame B for said band saw A, and a supporting or bed frame C upon which the saw frame is adjustable vertically so the band saw may be moved up or down to cut different thicknesses of lumber. As shown, the supporting frame has the main section C' and the slide section $C^2$, the latter having a flanged elbow $C^3$, bolted or otherwise secured at $C^4$ to the main section C', and the slide $C^5$ in the form of an upright shaft upon which the saw frame is movable vertically in adjusting it to raise the saw blade or lower it, as may be desired. The saw frame, as best shown in Figs. 1 and 3 is made in two sections B' and $B^2$, which are made right and left and are fitted together flatwise, as shown in Fig. 1 and provided in their inner abutting faces with gains $B^3$ which combine to form an opening fitting around the slide $C^5$ and fitting and bearing firmly around the slide and may be preferably lined with Babbitt metal, as shown best in Fig. 9.

It will be noticed that the sections B' and $B^2$ are open frames, and that the coinciding recesses $B^3$ therein are provided in both the upper and lower arms so that the saw frame will be guided on both the upper and lower shaft sections C, as will be understood from Figs. 2, 4 and 9 of the drawings. The sections of the saw frame are thus guided at points midway between their opposite ends and also midway between the outer sides or faces of the frame whereby I am able to support and guide the saw frame at its middle without interfering in any way with the operation of the straining devices, and also support and guide the saw frame in a plane with that of the band, as will be understood from Figs. 1 and 2 of the drawings, thereby relieving strains which would be apt to result from guiding the saw frame out of alinement with the plane of the saw. The frame sections B' and $B^2$ are secured together upon the shaft by connecting bolts $C^6$, see Figs. 2, 4 and 9, such bolts $C^6$ being arranged on opposite sides of the slide $C^5$ and the sections B' and $B^2$ are also connected at their upper edges by the saw guides D shown in Figs. 1 and 2. I prefer to employ two of these saw guides and to arrange them on opposite sides of the slide $C^5$, as shown in Fig. 1 of the drawings.

The band saw A is carried on wheels or pulleys E and F whose arbors E' and F' are mounted in boxes $f$ and $e$ carried by the sections B' and $B^2$ of the saw frame. The boxes $f$ are mounted in yokes $f'$ having shanks $f^2$ slidable in the frame sections B' and $B^2$ at one end thereof and arranged to be set up to any desired position by means of a screw $f^3$ passed through a bearing $f^4$ and having nuts on opposite sides of said bearings so the boxes $f$ may be adjusted as desired. The wheel or pulley F is weighted to form a balance wheel and drives the band, preferably by two belts applied to the band pulleys $E^2$ on the arbor F' of the pulley F. These two belts are applied from above to help counterbalance the saw frame.

The saw straining gear device provides means whereby the arbor of the pulley E may be set forward or back from the arbor of the pulley F and comprises in connection with the yokes G, carrying boxes $e$ for the arbor E, pulley shanks G' movable longitudinally in bearings $g$ in the frame sections B and B′ and having at their inner ends threaded bearings at G² to receive screwshafts H which being threaded in the bearings G² will when turned operate to move the yoke G relatively to the screwshaft H, and thus secure perfect tension between the said parts. This screwshaft may be turned in any suitable manner. As shown, the bevel pinions $h$ are journaled in bearings in the frames B and B′ and have square bores $h'$ through which the angular portion of the screwshaft H may slide and be driven by the bevel pinions H² meshing with the pinions $h$ to turn the same and thus turn the screwshafts, as best shown in Fig. 5 of the drawings. Levers I are pivoted at one end I′ to one end of links I² whose other ends are pivoted at I³ to the frame sections and these levers I are connected at their other ends by rods I⁴ to cranks J′ on a shaft J to which is connected a weighted lever J² whose weights J³ may be regulated according to the tension it is desired to put upon the band. The levers I connect between their ends with their respective screwshafts H, such connection being preferably adjustable and effected by means of a collar I¹⁰ having studs I¹¹, see Fig. 6, pivoted to the side plates of the levers I and nuts K threaded on the screwshaft H and projecting or sleeved in opposite directions in the opening I⁵ in the collar I¹⁰ about midway between the ends of the levers, the nuts being free to turn in the opening I⁵ so they may turn with the screwshaft H when adjusted thereon and having heads K′ at their outer ends bearing against the front and rear sides of the collar I¹⁰ to secure the same in connection with the screwshaft H. Manifestly by turning these nuts K in either direction along the screwshaft H, the point of connection of the lever I with the screwshaft may be varied, and when the desired adjustment and alinement is secured the nuts K may be locked in position by jam nuts K², as will be understood from Fig. 6 of the drawings. By this means I am able to adjust the connection of the straining device with the screwshaft H, and also to adjust the shaft H relatively to its connection with the yoke carrying the boxes for the arbor in order to secure the desired straining tension of the saw in the operation of the invention.

When the yokes carrying the arbors E are adjusted toward their outermost positions they project a considerable distance from their bearings $g$ on the saw frame and to support these overhanging projections I prefer to provide carriages P having rollers P′ running on tracks P² and a depending portion or hanger having side bars P³ extending down on opposite sides of said track P² and supporting at their lower ends collars P⁴ threaded on the shafts G′ and held thereto, so the shafts G′ move out and in with the operation of the straining gear being suspended from the rollers P′ of the carriage P.

The straining devices, best illustrated in Fig. 5, form the subject matter of a separate application for patent filed by me Nov. 16, 1906, Serial No. 343,701.

The saw frame is movable up and down on the supporting frame in order to set its cutting run up or down and thus regulate the thickness of the portion of lumber to be cut. As the frame is supported and guided midway between its ends I find it desirable to provide means for preventing any swinging of the saw frame on its guides and to this end I provide a shaft L journaled in bearings on the supporting frame and having crank arms L′ connected by rods L² with the saw frame on opposite sides of its central guide, as will be understood from Figs. 2 and 3 of the drawings, thus preventing any swinging of the saw frame and insuring its movement up and down in the desired plane at right-angles to the direction of the feed rolls, as more fully explained hereinafter. For moving the saw frame up and down I provide a shaft M having fixed to it the levers M′ and M² whose short arm $m'$ and $m^2$ are connected by pitmen $m^3$ with the saw frame so the rocking of the shaft M may move the saw frame up and down. The longer arms of the levers M′ and M² are weighted, as will be understood from Figs. 1 and 5, and by preference the weighted levers connected with the ends of the saw frame carrying the balance wheel F are heavier than those on the other levers because of the superior weight of the wheel F as compared with the wheel or pulley E. For rocking the shaft M, I provide a pitman N connected at one end with the long arm of one of the levers and at its other end with the hand lever O which may operate to set the saw frame up or down and secure it in any suitable position by means of stop pins on the quadrant O′ according to the different thicknesses of lumber to be sawed, as will be understood from Fig. 4 of the drawings.

By the described construction it will be seen that I provide a saw frame made in two sections fitting together face to face and having between the said sections bearings located about midway between the ends of the frame and also midway between the outer faces of the frame and in the plane of the saw blade, this construction being important as it supports the saw frame about its middle and enables the arrangement of the straining gear without in any way interfering with the movement of the saw frame when the latter is raised and lowered by the devices before described. These devices for raising and lowering the saw frame enable me to set the band saw up or down to cut at any desired point, and the supporting frame may be arranged as a stand as shown in Figs. 2 and 4, but it will be understood that it may be utilized as a hanger as shown in Fig. 9, in which the supporting frame and the saw frame are constructed as in Figs. 2 and 4 and the supporting frame is turned upside down and bolted up to overhanging beams. In this construction, shown in Fig. 9, the saw frame may be raised and lowered by means of the rod M³ connected with the weighted overhead lever M' connected by a pitman M¹⁰ with a band lever M¹¹ similar to the lever O.

The band saw is toothed for double cutting on its opposite edges and in operation the lumber to be sawed may be fed from one side of the saw in making one cut and then from the other side of the saw in making a second cut by means of suitable carriages.

At the left in Fig. 2, I provide a pit R in which an operator may stand in changing band saws.

I claim:

1. In an apparatus substantially as described, the combination of a supporting frame having an upright slide, a saw frame consisting of sections fitting together face to face and provided in their inner faces with recesses combining to fit and slide upon the vertical slide of the supporting frame, a band saw, and means for supporting the same, the vertical slide being arranged approximately midway between the ends of the saw frame and in the plane of the band saw.

2. The combination of a supporting frame having a main section and a slide section, the latter having a neck secured to the main section and provided with a slide in the form of an upright shaft having portions projecting above and below the neck, a saw frame movable vertically on said slide, means for setting the saw frame up and down, and means for supporting the band saw on said frame.

3. The combination of a supporting frame having a slide in the form of an upright shaft, having portions projecting above and below its connection with the supporting frame, a saw frame fitting midway between its ends upon and movable vertically upon said slide, means for moving the saw frame vertically, and means for supporting the band saw on said frame.

4. A saw frame composed of sections fitting together flatwise and having means for supporting a band saw and provided midway between its ends with coinciding recesses in the inner faces of the sections producing an upright opening forming a bearing and a supporting frame having a slide fitting said opening and upon which the saw frame may be moved vertically, and means for moving the saw frame vertically on said slide.

5. The combination in a saw frame made in similar sections fitted together flatwise and provided in their inner abutting faces with the recesses combining to form an opening, and a supporting frame having a slide in the form of an upright shaft fitting said opening and upon which the saw frame may be adjusted vertically.

6. The combination with a saw frame provided midway between its ends with an upright opening, a supporting frame having a slide in the form of an upright shaft fitting said opening, and swinging devices connecting the opposite ends of the saw frame with the supporting frame, whereby to prevent swaying of the saw frame during its vertical movements.

7. The combination of the supporting frame having a slide in the form of an upright shaft, a saw frame having means for supporting the band saw and provided midway between its ends with an upright opening fitting and movable along the slide of the supporting frame, a shaft journaled to the supporting frame and provided with cranks opposite approximately the ends of the saw frame, and links connecting such cranks with the respective ends of the saw frame whereby to guide the movements of the saw frame and prevent it from swaying as it is adjusted vertically along the slide.

8. The combination of a supporting frame having a slide in the form of an upright shaft, a saw frame having means for supporting a band saw and sliding midway between its ends on the slide of the supporting frame, a shaft journaled to the supporting frame and provided with cranks arranged approximately opposite the ends of the saw frame, links connecting said cranks with the respective ends of the saw frames, means for raising and lowering the saw frame, and devices for counterbalancing the saw frame.

9. The combination of a band saw, its pulleys, a saw frame composed of sections fitted together flatwise, a slide between said sections and upon which the saw frame is movable vertically, and saw guides comprising brackets supported upon the opposite sections of the saw frame.

EVAN T. DAVIES.

Witnesses:
JAMES BROWN,
THOMAS H. WARD.